United States Patent [19]

Förster

[11] Patent Number: 4,596,192
[45] Date of Patent: Jun. 24, 1986

[54] UNIVERSAL VEHICLE SYSTEM FOR THE PUBLIC LOCAL TRAFFIC

[75] Inventor: Hans-Joachim Förster, Stuttgart, Fed. Rep. of Germany

[73] Assignee: Daimler-Benz Aktiengesellschaft, Fed. Rep. of Germany

[21] Appl. No.: 126,695

[22] Filed: Mar. 3, 1980

Related U.S. Application Data

[63] Continuation of Ser. No. 798,877, May 20, 1977, abandoned.

[30] Foreign Application Priority Data

May 21, 1976 [DE] Fed. Rep. of Germany ....... 2622778

[51] Int. Cl.⁴ ...................... B61B 13/00; B61D 17/00
[52] U.S. Cl. .................................... 104/1 R; 29/428;
29/469; 104/118; 104/247; 105/18; 105/397;
280/403; 296/197
[58] Field of Search ...................... 104/18, 20, 118-120,
104/247, 1 R; 105/3, 18, 140, 144, 159, 215 C,
396, 397; 280/403; 220/4 C; 29/428, 469, 401.1;
410/3; 296/10, 196, 197

[56] References Cited

U.S. PATENT DOCUMENTS

| | | | |
|---|---|---|---|
| 1,875,214 | 8/1932 | Buderus | 105/3 X |
| 2,090,409 | 8/1937 | Vaszin | 104/247 |
| 2,101,024 | 12/1937 | Heinze | 104/247 |
| 2,114,150 | 4/1938 | Rodman | 29/428 X |
| 2,251,584 | 8/1941 | Fageol et al. | 280/403 |
| 2,263,578 | 11/1941 | Hickman | 105/215 C |
| 2,399,929 | 5/1946 | Kearns | 280/403 X |
| 2,407,007 | 9/1946 | Henrichsen | 280/403 X |
| 2,425,948 | 8/1947 | Lucien | 296/196 X |
| 2,555,556 | 6/1951 | Panzegrau et al. | 29/428 UX |
| 2,718,194 | 9/1955 | Ruhlmann | 104/247 |
| 2,843,417 | 7/1958 | Wahl | 105/3 X |
| 2,865,306 | 12/1958 | Bock et al. | 105/3 |
| 3,096,730 | 7/1963 | Gutridge | 410/94 |
| 3,252,430 | 5/1966 | Eckhardt et al. | 105/397 X |
| 3,263,950 | 8/1966 | Terlecky et al. | 410/60 |
| 3,311,067 | 3/1967 | Gretschel et al. | 105/215 X |
| 3,506,152 | 4/1970 | Stollman | 220/4 C X |
| 3,552,321 | 1/1971 | Priebe | 104/18 |
| 3,605,935 | 9/1971 | Gilbert | 104/20 X |
| 3,638,580 | 2/1972 | Yard | 105/3 X |
| 3,874,306 | 4/1975 | Coons et al. | 105/215 X |
| 4,034,680 | 7/1977 | Hamada et al. | 104/247 X |

FOREIGN PATENT DOCUMENTS

| | | | |
|---|---|---|---|
| 211681 | 10/1960 | Austria | 280/403 |
| 1208329 | 1/1966 | Fed. Rep. of Germany | 105/3 |
| 2403088 | 7/1975 | Fed. Rep. of Germany | 296/196 |
| 2509713 | 9/1976 | Fed. Rep. of Germany | 104/247 |
| 1129083 | 1/1957 | France | 105/396 |
| 370159 | 4/1939 | Italy | 280/403 |
| 597966 | 2/1948 | United Kingdom | 296/196 |
| 567622 | 8/1977 | U.S.S.R. | 280/403 |

*Primary Examiner*—Randolph A. Reese
*Attorney, Agent, or Firm*—Craig and Burns

[57] ABSTRACT

A vehicle system for local public passenger transportation, in which a number of vehicle components are used to realize a vehicle system according to a building-block system. The vehicle components are so constructed that they can be assembled into vehicles or trains usable only with tracks, selectively with or without tracks, or only without tracks.

1 Claim, 22 Drawing Figures

UNIVERSAL VEHICLE SYSTEM FOR THE PUBLIC LOCAL TRAFFIC

This is a continuation of application Ser. No. 798,877, filed May 20, 1977 now abandoned.

The present invention relates to a vehicle system for the conveying of public passengers which includes vehicles which can be used only with tracks, selectively with or without tracks, or only without tracks.

The rail systems for locally conveying public passengers distinguish themselves by their suitability for the serivce of main lines, by high transportation or conveyance capacity and, insofar as they include a line of their own, by high conveyance velocity, punctuality, comfort and high environmental compatability. On the other hand, the rail systems are not really adaptable to all localities and they possess the known weaknesses of requiring a considerable amount of surface area, and of high requirements as regards the infrastructure.

Transportation systems with passenger cabins, especially those with small cabins, presuppose a network covering a relatively long distance or large area but including many stopping points, if they are to fulfill the goal of providing a passenger motor vehicle-like traffic service with fixed destinations which minimizes the approach and waiting periods of time. In ideal form, a transportation system with passenger cabins possesses advantages in service, travelling speed, and comfort. Moreover, such transportation systems have low personnel costs as a result of the automatization and are favorable as regards environment. However, such transportation systems have weaknesses in managing occurrences of a relatively large number of passengers at a single point, in the costs of the infrastructure, in the energy consumption and in the adaptability to varying traffic conditions. Above all, the more closely knit the planned network of the transportation system, the more difficult it is to install the necessary network on elevated lines into the cities. If, for these reasons, the network becomes wide-spread and is constructed so as to be of a limited expanse, then small cabin systems combine only the disadvantages of passenger motor vehicles and rails namely small transportation capacity and a requirement of tracks. Consequently, no future changes can be ascribed to this transportation system with small cabins, even though certainly many of the findings and experiences gained during the development are transferable also to other transportation systems.

The strength of the bus traffic system resides in its flexibility. As a public passenger system on the road, the bus traffic system can service in principle all of the traffic services created by the passenger motor vehicle. Additionally, such traffic system has no special requirements as to infrastructure, requires only small investments, is a large series product and, according to the most recent developments, is quite readily compatible with the environment—by virtue of engines with low emissions.

Also known are the system-conditioned weaknesses of the transportation system of buses such as, for example, the limited size of the transportation units, the relatively high personnel costs resulting therefrom and the traffic impairment by other vehicles which utilize the same roads. Of course, many of these shortcomings can be reduced by bus lanes, by priorities at road intersections, etc.; however, the costs of the infrastructure which then have to be charged to the bus traffic system would increase considerably.

The combination of the positive properties of the track-bound and of the trackless transportation system is therefore sought after. This is at present already practiced traffic-wise or at least aimed at in large cities as so called "integrated traffic system." In this "integrated traffic system," road traffic (bus, taxi) and rail traffic (city-, underground- and underground trains) are operated as a linked traffic system. In principle also the private passenger motor vehicle belongs thereto as a result of parking spaces at the railroad stations (Park and Ride). The railroads service the main lines, while buses service the surface or they are used for the interconnection of interchanges and, eventually, for the rapid conveyance with a limited number of stops, i.e., express bus service. The interchange places for the respective transportation systems in the "integrated traffic systems" are constructed as favorable as possible, the schedules are matched to one another, and the tickets are valid from start to destination for all of the transportation systems. However, unfortunately, also this "integrated traffic system" also provides an interrupted service since it may be necessary for the passenger to transfer to several different units in the transportation system to reach a given destination.

It is a technical task of the present invention, to create, in lieu of the "integrated traffic system", an "integrated transportation system" which can readily adapt itself to the respective traffic task, yet treates the passenger as carefully as possible. The requirements of the system of the present invention are a servicing of the surface as also of the main lines, adaptation to changing traffic demands as well as to new traffic services, high conveyance velocity, punctuality and high travel comfort, lowest possible demands as regards infrastructure, advantageous transportation units which should be large-series products, low energy consumption and, of course, environmental compatibility.

As solution to the underlying problems, it is proposed according to the present invention that a vehicle system is provided wherein the vehicle components can be assembled or disassembled according to the building-block principle. For this purpose, according to the present invention, vehicles or trains usable only with tracks, selectively with or without tracks, or usable only without tracks are provided with the vehicles or trains being assembled from the following vehicle components comprising bus-like passenger cells of different lengths and closed on all sides each with a driver position and with installation space for at least one non-steerable axle adapted to be driven and for a steerable axle as well as with installation space for at least one driving source;

bus-like passenger cells open unilaterally at the rear end, possibly of different lengths, with a driver position and with an installation space for at least one non-steerable axle adapted to be driven and for a steerable axle;

bus-like passenger cells open at both ends in front and to the rear, possibly of different lengths, without driver position and with installation space for a non-steerable axle or for a tandem arrangement of such axles;

bus-like passenger cells open unilaterally at the front, possibly of different lengths, without driver position and with installation space for a non-steerable axle or for a tandem arrangement of such axles;

movable accordion-like or similarly encapsulated cell connections transmitting pushing or tractional forces for the connection of the open, mutually facing ends of passenger cells;

non-steerable vehicle axles adapted to be driven with corresponding axle suspension;

non-steerable, non-driven vehicle axles or tandem arrangements of such axles with corresponding axle suspension;

steerable vehicle axles with corresponding axle suspension;

transverse guide means for non-steerable axles adapted to be influenced by track guide means on the side of the track;

cross guide means for steerable axles adapted to be influenced by track guide means on the side of the track;

drive sources, preferably internal combustion engines with change-speed transmissions, adapted to be fed from an energy supply taken along in the vehicle;

electric motors as drive source adapted to be fed from wires.

The trackless road vehicles, which will represent numerically the largest part of the traffic system, must remain as universally usable as the present-day bus.

The vehicle modification which is provided for the type of traffic system utilizing tracks must be able to perform the same service that is offered at present by progressive rail systems or will be offered by the same in the future. A large cohesive traffic system will be of interest or will become of interest in all those places where the traffic density permits. Only the track-tied traffic system on its own line will, in the future, enable a fully automatic operation. The automatic operation will be carried out, not necessarily but probably predominantly, on a cohesive network with exclusive lines of its own and with supplied energy such as electrical energy.

It has been proved that advantages can be gained under certain circumstances for the local public passenger traffic if the road vehicles are able to travel also temporarily and eventually only over short distances on tracks. The vehicles of such a traffic system must therefore be both steerable from the inside as also guided by tracks from the outside. In order to satisfy all conceivable requirements, the drive of the road vehicle must also be constructed multi-modal, i.e., with self-contained energy source (preferably fuel and internal combustion engine) or with supplied energy (preferably electrical drive). In networks, in which the trackless portion is very small and always adjoins a track-tied portion, a modification is also feasible which has only an electric drive and which for the trackless distance carries along the energy in batteries. However, by reason of the large weights, this will remain the exception.

The requirement for economy can be fulfilled in that the system as a whole is conceived according to the building-block principle. As a result thereof, all three types of traffic can be reduced to few different assembly building blocks in a manner favorable as regards costs. It is possible to come back to the large-series manufacturing techniques, already introduced and proved in practice, as regards construction and manufacture. This point is of particular importance for the present invention.

In further development of the present invention, the building-block principle can also be applied to the semi-finished construction of the cell, and more particularly in that at least a part of the following shaped cell modules of same width and height are readied, which are so constructed that they can be connected together into passenger cells of a desired appearance and suitable length. For this purpose, the cell modules may be provided with:

continuous window modules, window modules with installation space for a non-steerable, non-driven axle, window modules with installation space for a non-steerable, driven axle, window modules with installation space for a steerable axle, window modules with installation space for a driving source, boarding modules, driver position modules with boarding, driving position modules without boarding, cell termination on the side of the driver position, rear cell termination with installation space for the driving source, rear cell termination, simple, coupling member for open cell end in front, and coupling member for open cell end in the rear.

These and other objects, features and advantages of the present invention will become more apparent from the following description when taken in connection with the accompanying drawing which shows, for purposes of illustration only, several embodiments in accordance with the present invention, and wherein:

FIG. 11 is an artistic sketch of another vision with examples of the use of vehicles utilizable purely on roads and purely on tracks.

Figure 1:
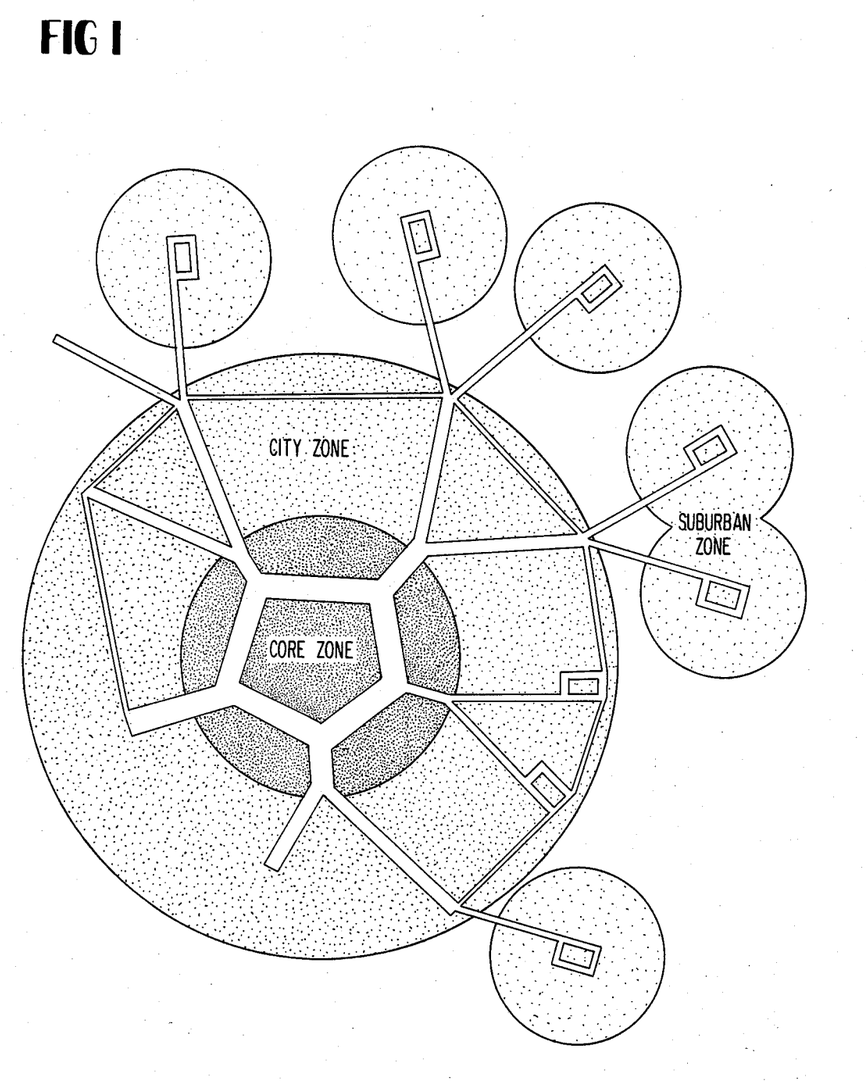
FIG. 1 is a schematic view of a traffic system in the public passenger local traffic of a large city.

Referring now to the drawing, and more particularly to the schematic view of FIG. 1, the load of the main traffic paths is indicated by the corresponding width thereof. A high traffic concentration and a corrsponding high load of the traffic arteries exists in the core zone. The use of track-tied vehicles on their own line is acceptable in that case and is also required for the maintenance of a punctual line schedule. Vehicles, which travel only in the core zone, will therefore always be operated on tracks only. They are conceived exclusively for track operation: large conveyance space, long trains, capable of being operated both in the forward and backward directions. In the suburban zones in which the traffic thins out, the traffic system has to be designed for surface service. Because of the free use of the road, only the use of trackless vehicles can be accepted here. Vehicles which travel both in the suburban zone and also in the city zone or even in the core zone will therefore be constructed for track or surface service. These last mentioned vehicles, in the city and in the core zone, utilize the elevated lines of the track-tied vehicles of the local public passenger traffic system.

The dual use of the elevated lines of the public passenger local traffic system having purely track-tied vehicles along with the vehicles constructed for track or surface service, economic reasons of the manufacture of these vehicles makes it necessary to employ a uniform basic concept with respect to the dimensions and construction for all types of vehicles thereby permitting the development of a traffic system which can be assembled in accordance with the proposed building-block system.

Figure 2:
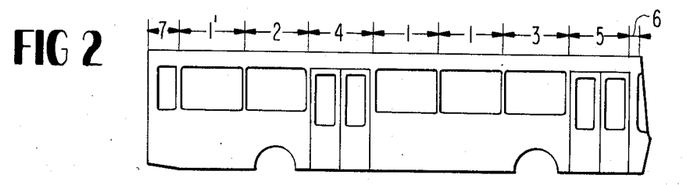
FIGS. 2, 3, 3a and 4 are schematic side views of different passenger cells as building blocks for a building-block system to achieve the dual traffic system of the present invention.
Figure 2:
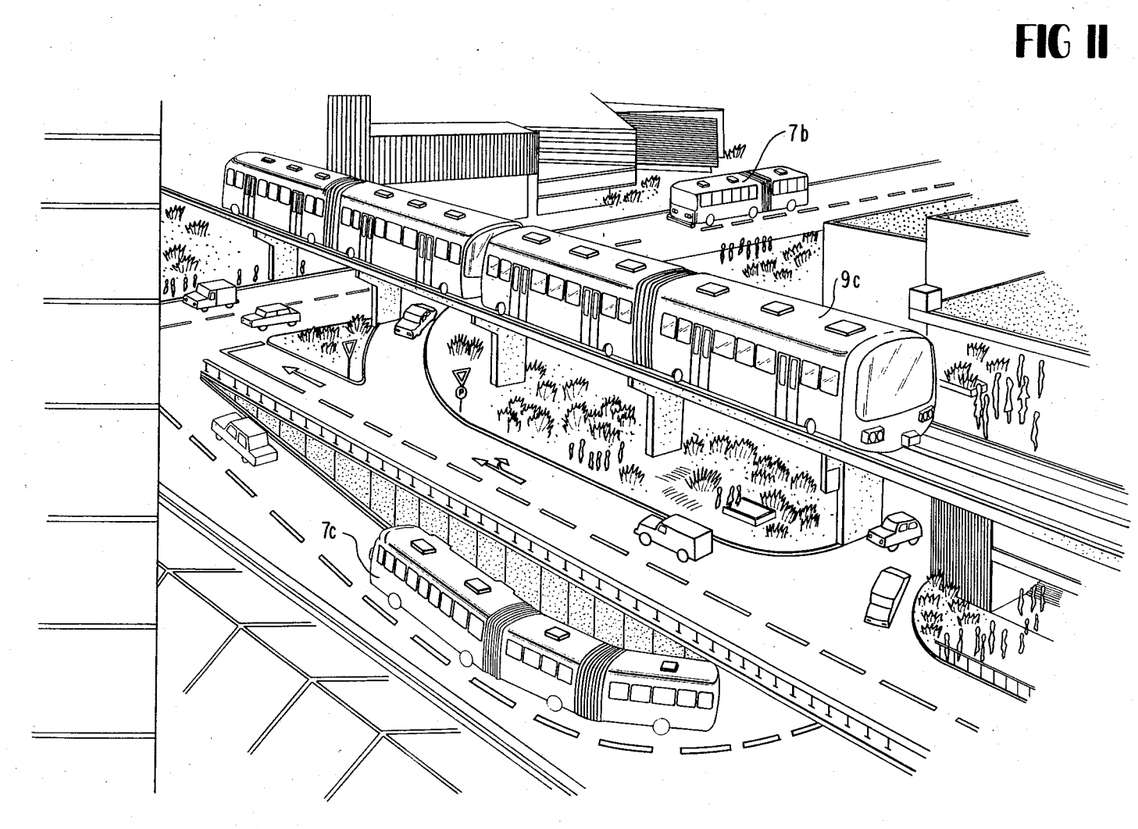
Figure 3:
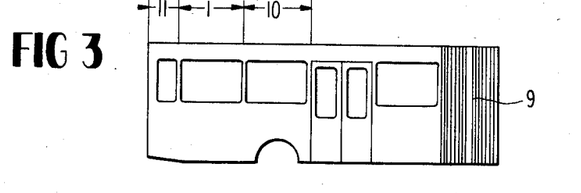
Figure 3A:
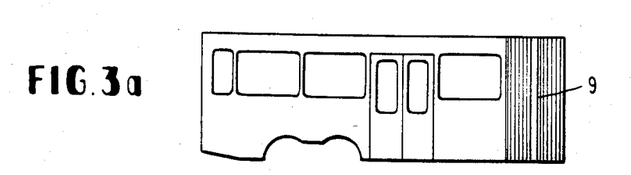
Figure 4:
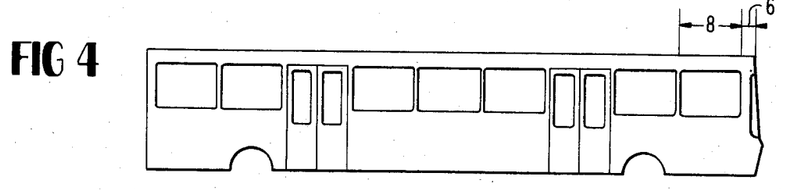

Dimensions for optimum traffic considerations are selected for the vehicle cells without rigid consideration of present-day regulations, and more particularly, the dimensions are selected on the assumption that after this new system of the public passenger local traffic has proved itself, the corresponding exceptions will be granted. In accordance with the present invention, a cell may be provided having a maximum width of 2.6 meters and an average standing height of 2.2 meters. FIGS. 2-4 provide an example of a cell constructed according to a 1.5 meter module. FIG. 2 provides an illustration of uninterrupted window modules 1, window modules 2 with installation space for a driving axle, window modules 3 with installation space for steerable axle, boarding modules 4, driver position module with boarding 5, a forward cell termination 6, and a rearward cell termination 7. FIG. 4 provides an example of a and driver position module without boarding 8 and a forward cell termination 6, with FIG. 3 providing an example of a and coupling member 9.

Two basic bodies exist. The main vehicle FIG. 2 has a length of 11.5 meters, the "trailer" of FIG. 3 has a length of 7.5 meters. With slight changes, also a special form for the purely track-tied operation is possible (FIG. 4) with an overall length of 15 meters. The floor is initially determined uniformly at 0.75 meters above ground. The aim toward lowering the floor in city buses to 0.50 to 0.54 meters is contrary to the concept of universality. Whether a lowering of the floor for the road vehicles is possible without excessive negative consequence for the entire vehicle can be determined only from the constructive detailing. In order to be able to board level both from the ground as also from the railroad platform, adjustable steps have to be provided. The cells must be adapted to be reinforced for absorbing traction forces (train formation).

Figure 5A:
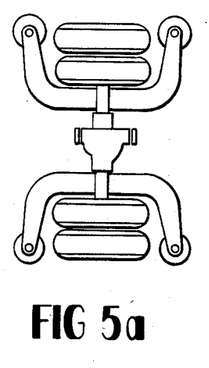
FIGS. 5a to 5f are schematic plan views of different axles of the building-block system of the present invention.
Figure 5B:
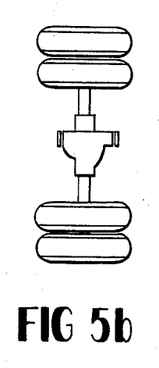
Figure 5C:
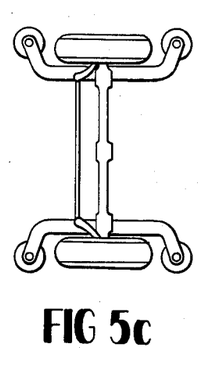
Figure 5D:
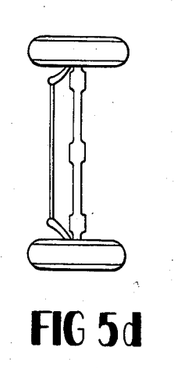
Figure 5E:
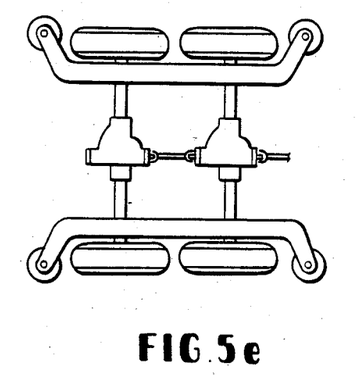
Figure 5F:
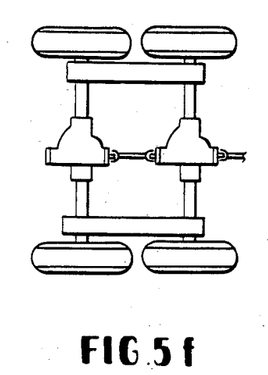
Figure 6:
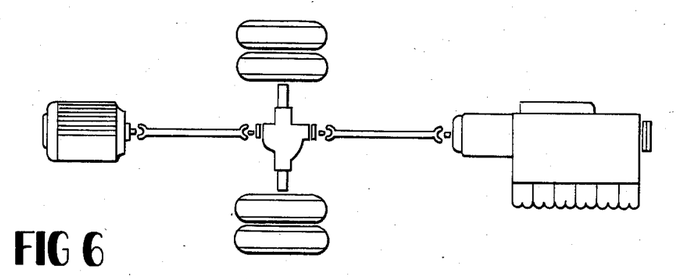
FIG. 6 is a schematic plan view on a drive as building block of the system according to the present invention.

As regards the axles and the guidance of the vehicle, for all vehicles both of the trackless as well as of the track-tied traffic, axles with pneumatic tires are provided. The axle loads of maximum 10 tons (with exception up to 11 tons) which are prescribed for the road, will be preserved (twin tires, FIG. 5b). Single-tire mountings with 7 tons of load-bearing force are provided for the steerable axle (FIG. 5d). A tandem arrangement of axles with single tire mountings is shown in FIG. 5f. A dimension of 800 mm. is assumed for the wheel outer diameter, whereby it is presupposed that the efforts undertaken at present by all tire manufacturers for increasing the load bearing capacity of tires of small diameter will have success. The low wheel diameter in conjunction with the floor height of 0.75 meters results in very small wheel installations which are then preserved also for the purely track-tied vehicles and hardly impose any great limitations as regards seat and standing space distribution.

Of the various possibilities for the external guidance only the positive guidance system will be considered by reason of the requirement for a train formation. The "road axles" are provided with guide rolls for the track guidance similar to the constructions which are successfully in operation with the underground in Paris, Toronto, etc. (FIGS. 5a and 5c). The rear axle which is non-pivotal in road traffic (FIG. 5a) can be made pivotal for the track-tied operation within a small angular range which depends on the wheel base and on the radius of curvature. If this range is small, for example, ±4° with a wheel base of 6 meters and a minimum radius of curvature of 50 meters, then no special suspension construction is necessary therefor. The generally provided pneumatic spring system provides this degree of freedom with correct construction and design. For stability reasons, the axle must always be locked during road operation. The road operation will make the larger demands in spring path, type of spring and damping. The systems developed therefore will be preserved with the track guidance. Only the rear axle is provided as driven axle, of which a non-driven modification exists only for the special vehicle of the trackless traffic.

An installation for fuel operation with an internal combustion engine and with a transmission and a second installation for the electric drive, consisting of an electric motor with electronics and control, are required for the drive. In order to remain as fully as possible within the building block system, a horizontal engine of extremely flat type of construction is desirable. With the floor height of 0.74 m., at most 450 mm. are available as maximum height for such a flat engine inclusive of the engine housing. A dry sump, a flat arrangement of the auxiliary apparatus and a favorable conduction of the air and exhaust gas channels are necessary therefor. The transmissions are, of course, automatic with retarder. Engines with 150 and possibly 200 kw should be available as driving power. The same spatial limitations apply for the accommodation of the electric drive.

It need not be decided at present whether the current supply of the driving motors which depends on electric conductors is to take place by way of current rails, as is known from the subway systems, or whether, for safety reasons, ground rails and (suspended) drive wires are necessary.

Possible variations which can be assembled from these building blocks are illustrated in FIGS. 7 to 11.

Figure 7A:
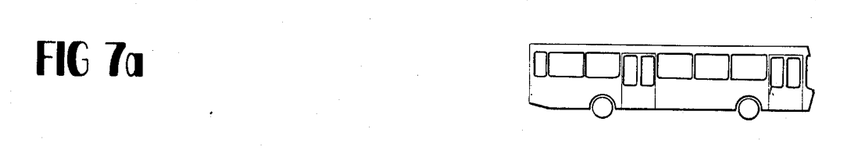
FIGS. 7a to 7c are schematic side elevational views of vehicles utilizable only on roads, i.e., without tracks, which can be obtained from the building-block system of the present invention.

Three units are provided as road vehicles (FIGS. 7a to 7c or reference numerals 7a or 7c in FIG. 10 or reference numerals 7b and 7c in FIG. 11) which are formed of two building block elements:

In FIG. 7a, a universal bus is provided having a length of 11.5 meters with about 44 seats and about 31 standing spaces (0.25 m²/person) or with about 61 standing spaces according to the German road regulations.

Figure 7B:
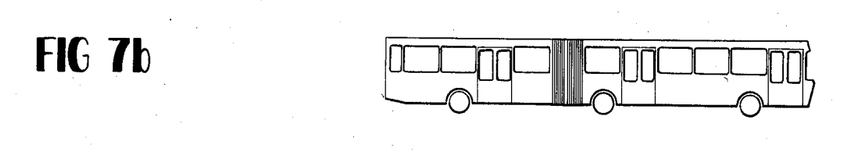

In FIG. 7b, a joint bus is provided which is formed of a main vehicle generally designated by the reference numeral 100 and a trailer generally designated by the reference numeral 200. The joint bus has a length of 17.5 meters, with about 64 seats and about 46 standing spaces (0.25 m²/person) or with about 106 standing spaces according to the German road regulations.

Both types of vehicle are already admitted at present in similar form in the Federal Republic of Germany.

Figure 7C:
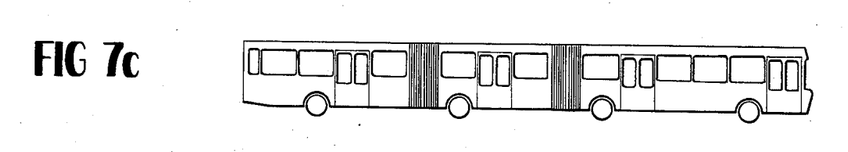

In FIG. 7c, an element bus is provided which is formed of the main vehicle and of two "trailers" 200, 300. The element bus has a length of about 23.5 meters with about 84 seats and about 61 standing spaces (0.25 m²/person).

Such a vehicle (element bus) would not be permitted on the roads according to the regulations existing at present in Germany. By reason of the large passenger capacity of the element bus, it offers advantages especially for the connection of main centers and subsidiary centers in the rush hours of the traffic. Since, however, the maneuverability need not be poorer than that of the joint buses (possibly with the exception of backing up), such a modification offers favorable prerequisites which could be examined in a test stage in quasi-practice.

Figure 8A:
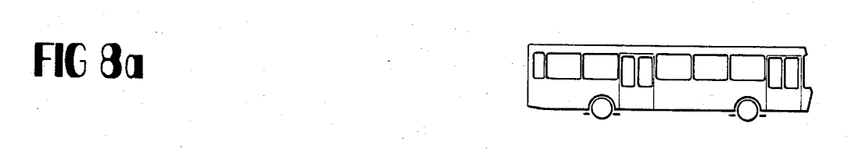
FIGS. 8a to 8c are schematic side elevational views of various vehicles obtainable from the building-block system of the present invention which can be used selectively on roads as also on tracks, i.e., vehicles with dual use.
Figure 8B:
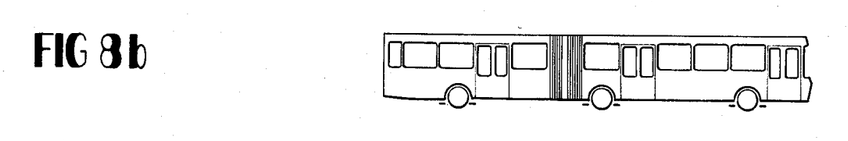
Figure 8C:
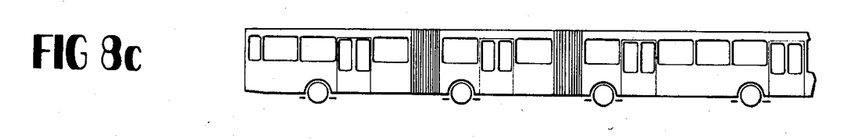
Figure 10:
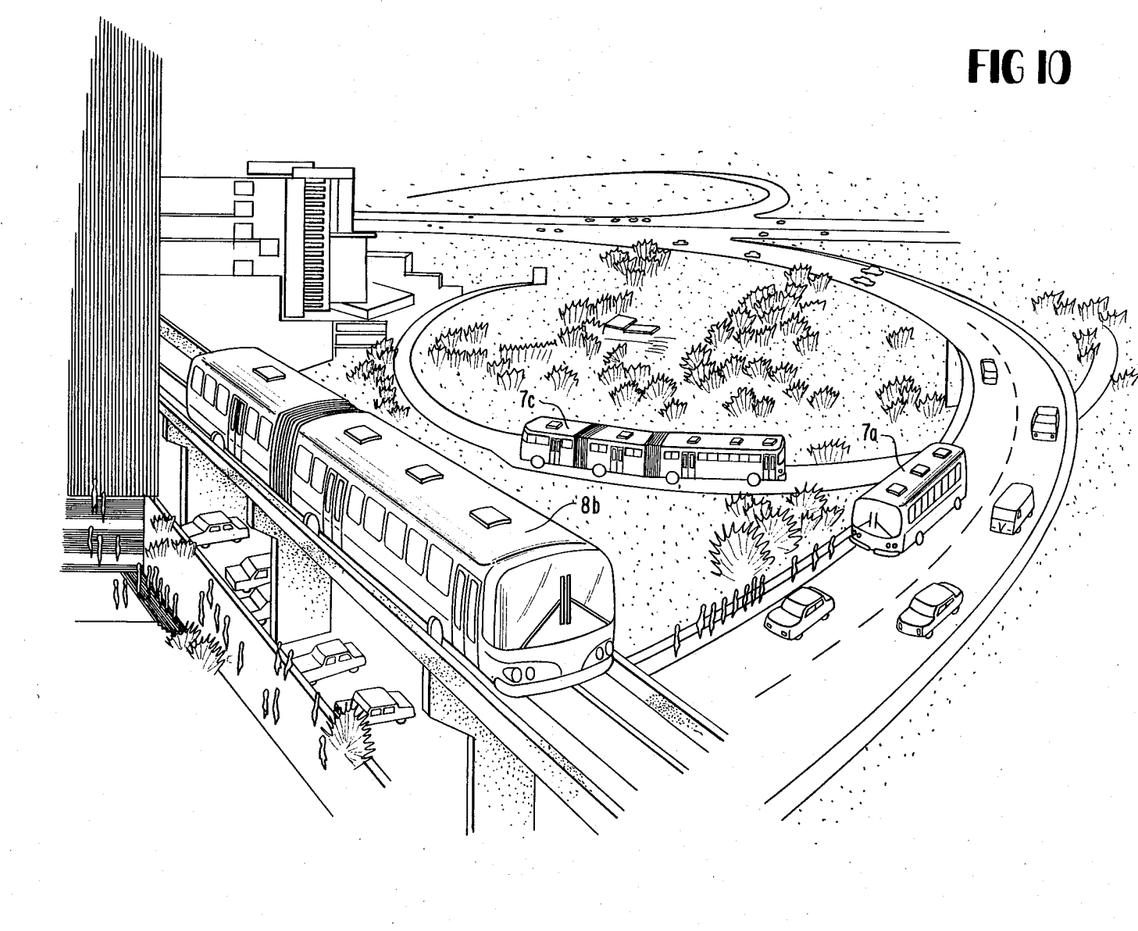
FIG. 10 is an artistic sketch of a traffic intersection point with examples for the use of vehicles utilizable purely on roads and of vehicles utilizable in a dual manner.

All of the above-mentioned road vehicles and especially the element bus are possible also as dual mode vehicles by the use of the axles with guide rollers (FIGS. 8a to 8c, reference numeral 8b in FIG. 10). The track guidance takes place by lateral guide tracks at a distance of about 25 cm similar to the guidance, which has been utilized in subways. These guide tracks may also be current rails. During the track-tied operation, the driving axle of the main vehicle must be pivotal and must therefore be unblocked and the positive steering of the trailer elements must be released. This must take place automatically by conventional means when entering the track and vice-versa when leaving the same.

The bifurcations (switches) of the track-tied network are active switches with pivotal tongues. Level intersections are not provided in the track-tied part. They are avoided at present in all modern subways for traffic and safety reasons.

Whether the drive of the dual-mode vehicles can take place only by way of the internal combustion engine which, of course, would result in low costs or whether certain portions of the network of the traffic system such as, for example, longer tunnel distances also require an electric drive can be decided only in the individual case. A bi-modal drive, consisting of combustion engine and electric motor is possible; however, additional weight and additional costs result therefrom.

Figure 9A:
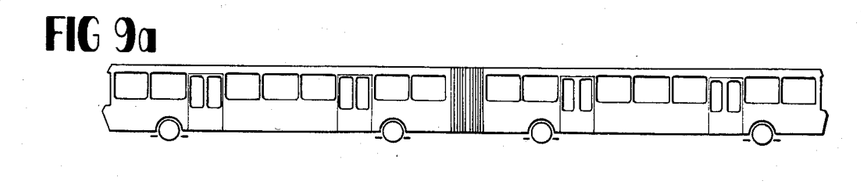
FIGS. 9a and 9b are schematic side elevational views of two vehicles from the same building block system which are of different length and can be used only on tracks.
Figure 9B:
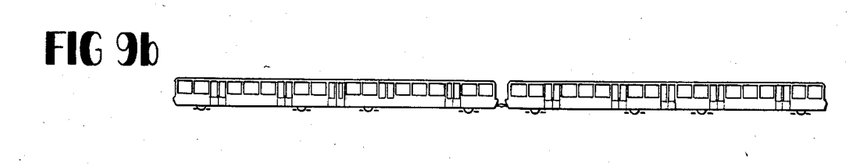

Vehicles for the track-tied operation, at first all dual-mode vehicles, can be used also exclusively in the track-tied network. With particularly high traffic density, it may also be desirable to have available larger units (FIGS. 9a and 9b, reference numeral 9c in FIG. 11). By the exclusive use of the twin-tire ten-ton axles, a vehicle having a length of about 15 meters can be constructed in which, for example, only each front axle is driven. By coupling together two such units, a twin wagon will result having a length of about 30 meters with, for example, 110 seats and about 100 standing spaces (0.25 m²/person) as shown in FIG. 9a or in FIG. 11 where it is indicated by reference numeral 9c. For those vehicles which can be used only with tracks, the electric drive will predominate. By coupling together two or more twin wagons, a train results (FIG. 9b). However, it may be assumed that the automation of the train traffic on large cohesive networks with tracks enables the elimination of longer trains in favor of a closer train sequence.

It offers no difficulties to so construct the units that the traffic is possible substantially similarly in both driving directions.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A system for manufacturing a plurality of vehicles forming a local public passenger transportation system, characterized in that the local public transportation system services an inhabited area comprising an inner core zone, an outer city zone, and a suburban zone; at least one of said vehicles of the local public transportation system is adapted to be used only with a track and service the inner core zones; at least one other of said vehicles is a dual mode vehicle adapted to be selectively used with or without a track and to service the outer city zone; and at least a further one of said vehicles of the local public transportation system is adapted to be exclusively used on a road surface without tracks and to service the suburban zones; said vehicles in the local public transportation system are constructed and assembled in a building-block fashion from at least one of a plurality of modular vehicle components comprising:

bus-like passenger cells of differing lengths which are closed on all sides, each of the bus-like passenger cells including a driver position module, an installation space for accommodating at least one non-steerable driven axle, an installation space for accommodating one steerable axle, and an installation space for accommodating a drive source;

bus-like passenger cells of differing lengths open at a rear end each of said open rear end bus-like passenger cells including a driver position module, an installation space for accommodating at least one non-steerable driven axle, and an installation space for accommodating one steerable axle;

bus-like passenger cells of differing lengths open at a front end, without a driver position module, each open front end passenger cell including an installation space for accommodating one of a non-steerable axle or a tandem arrangement of non-steerable axles, said open front end passenger cells being adapted to be connected to a bus-like passenger cell open at the rear end;

bus-like passenger cells of differing lengths open at both a front end and a rear end, each of said bus-like passenger cells open at both the front and rear ends including an installation space for accommodating one of a non-steerable axle or a tandem arrangement of non-steerable axles;

movable accordion-like passenger cell connection means transmitting pushing and tractional forces for connecting mutually facing open ends of the bus-like passenger cells;

driven non-steerable vehicle axles adapted to be mounted on the bus-like passenger cells;

one of non-steerable non-driven vehicle axles or tandem arrangements of non-steerable non-driven vehicle axles adapted to be mounted on the bus-like passenger cells;

steerable vehicle axles adapted to be mounted on the bus-like passenger cells;
cross guide means for non-steerable axles adapted to be influenced by track guide means on a side of the track;
cross guide means for steerable axles adapted to be influenced by track guide means on a side of the track; and
drive sources adapted to be fed from an energy supply carried in the vehicle including at least one of an internal combustion engine and electric motors adapted to be fed from electric conductors.

* * * * *